United States Patent
Brück et al.

(10) Patent No.: US 9,719,396 B2
(45) Date of Patent: Aug. 1, 2017

(54) METHOD FOR OPERATING A DEVICE FOR CONVEYING A LIQUID

(71) Applicant: CONTINENTAL AUTOMOTIVE GMBH, Hannover (DE)

(72) Inventors: Rolf Brück, Bergisch Gladbach (DE); Jan Hodgson, Troisdorf (DE); Christian Vorsmann, Köln (DE)

(73) Assignee: Continental Automotive GmbH, Hannover (DE)

( * ) Notice: Subject to any disclaimer, the term of this patent is extended or adjusted under 35 U.S.C. 154(b) by 50 days.

(21) Appl. No.: 14/895,798

(22) PCT Filed: May 9, 2014

(86) PCT No.: PCT/EP2014/059515
§ 371 (c)(1),
(2) Date: Dec. 3, 2015

(87) PCT Pub. No.: WO2014/195081
PCT Pub. Date: Dec. 11, 2014

(65) Prior Publication Data
US 2016/0131005 A1    May 12, 2016

(30) Foreign Application Priority Data

Jun. 4, 2013    (DE) .................. 10 2013 105 712

(51) Int. Cl.
*F01N 3/00*    (2006.01)
*F01N 3/10*    (2006.01)
*F01N 3/20*    (2006.01)

(52) U.S. Cl.
CPC ........... *F01N 3/208* (2013.01); *F01N 3/2066* (2013.01); *F01N 2610/02* (2013.01);
(Continued)

(58) Field of Classification Search
CPC ......... F01N 2610/02; F01N 2610/1426; F01N 2610/144; F01N 2610/1486;
(Continued)

(56) References Cited

U.S. PATENT DOCUMENTS

2010/0107615 A1* 5/2010 Chmielewski ........ F01N 3/2066
60/303
2010/0175369 A1* 7/2010 Op De Beeck ...... B01D 35/027
60/274
(Continued)

FOREIGN PATENT DOCUMENTS

DE    102008001948    1/2009
DE    102008031052    1/2009
(Continued)

*Primary Examiner* — Phutthiwat Wongwian
*Assistant Examiner* — Diem Tran
(74) *Attorney, Agent, or Firm* — Cozen O'Connor

(57) ABSTRACT

A method for operating a device configured to deliver a liquid includes: a) back-suctioning a liquid situated in a pressure line section counter to a usual delivery direction by at least one pump; b) monitoring at least one operating parameter of the at least one pump during the back-suctioning, the at least one operating parameter being representative of a counterpressure that the at least one pump operates against during the back-suctioning; and c) detecting an increase in the counterpressure, and stopping the back-suctioning.

7 Claims, 2 Drawing Sheets

(52) U.S. Cl.
CPC  *F01N 2610/144* (2013.01); *F01N 2610/1426* (2013.01); *F01N 2610/1486* (2013.01); *F01N 2610/1493* (2013.01); *F01N 2900/0414* (2013.01); *F01N 2900/1808* (2013.01); *F01N 2900/1822* (2013.01); *Y02T 10/24* (2013.01)

(58) Field of Classification Search
CPC ..... F01N 2610/1493; F01N 2900/0414; F01N 2900/1808; F01N 2900/1822; F01N 3/2066; F01N 3/208; Y02T 10/24
USPC .................................. 60/286, 295, 301, 303
See application file for complete search history.

(56) References Cited

U.S. PATENT DOCUMENTS

| | | | | |
|---|---|---|---|---|
| 2011/0047972 A1* | 3/2011 | Bauer | .................... | B01D 53/90 60/274 |
| 2013/0025269 A1* | 1/2013 | Hodgson | ............... | F01N 3/2066 60/317 |
| 2013/0032214 A1 | 2/2013 | Saby et al. | | |
| 2013/0037116 A1* | 2/2013 | Crary | .................. | B01D 35/027 137/1 |
| 2014/0096512 A1* | 4/2014 | Bauer | .................. | F01N 3/2066 60/295 |

FOREIGN PATENT DOCUMENTS

| | | |
|---|---|---|
| DE | 102008010105 | 8/2009 |
| DE | 102010016654 | 11/2010 |
| DE | 102011076429 | 11/2012 |
| DE | 102011112325 | 3/2013 |
| FR | 2 958 681 A1 | 10/2011 |
| FR | 2 981 689 A1 | 4/2013 |

\* cited by examiner

METHOD FOR OPERATING A DEVICE FOR CONVEYING A LIQUID

CROSS-REFERENCE TO RELATED APPLICATIONS

This is a U.S. national stage of application No. PCT/EP2014/059515, filed on 9 May 2014, which claims priority to the German Application No. DE 10 2013 105 712.8 filed 4 Jun. 2013, the content of both incorporated herein by reference.

BACKGROUND OF THE INVENTION

1. Field of the Invention

The invention relates to a method for operating a device for delivering a liquid, in particular for the evacuation thereof. The device may be used for example in a motor vehicle in order to deliver a liquid additive to an exhaust-gas treatment device for the purification of the exhaust gases of an internal combustion engine of the motor vehicle, and to feed the liquid additive to the exhaust-gas treatment device in dosed fashion.

2. Related Art

In exhaust-gas treatment devices to which a liquid additive for exhaust-gas purification is fed, the method of selective catalytic reduction (SCR), for example, is implemented. In the method, nitrogen oxide compounds in the exhaust gas of an internal combustion engine are reduced with the aid of a reducing agent. Ammonia is commonly used as reducing agent. Ammonia is usually stored in motor vehicles not directly but rather in the form of a reducing agent precursor solution. One reducing agent precursor solution which is particularly frequently used is liquid urea-water solution. A 32.5% liquid urea-water solution is available under the trade name AdBlue®. The method described here is suitable for the operation of a device by which a reducing agent precursor solution can be fed to an exhaust-gas treatment device.

In the development, production and operation of devices for the provision of such liquids for exhaust-gas purification, it must generally be taken into consideration that the (aqueous) liquids can freeze at low temperatures. The 32.5% urea-water solution, for example, freezes at −11° C. In the automotive field, such low temperatures can arise in particular during long standstill periods in winter. When the liquid freezes, a volume expansion typically occurs. This volume expansion can damage the device for delivering the liquid.

For this reason, it is known to evacuate a device of this type upon a stoppage of operation. During the evacuation process, the liquid is removed from the device and replaced with air from the surroundings. Typically, air is drawn into the device via an injector on an exhaust line, while at the same time the liquid is delivered back into a tank. Then, no liquid is present within the device during the standstill phase after a stoppage of operation. Accordingly, it is also not possible for any volume expansion of the liquid to occur within the device. It is, however, a problem that an evacuated device must be refilled before a resumption of operation. During the refilling of the device, there is in particular the problem that undesired leakage of liquid through the injector can occur, in particular if the amount of liquid that must be fed to the device in order to completely refill it is not known exactly. Furthermore, both during the evacuation of the device and during the filling of the device, an unnecessarily long period of operation of a pump should be avoided.

A relatively short operating duration of the pump firstly reduces the energy consumption during the filling and evacuation processes. Secondly, it is also possible in this way to prevent damage from being caused to the pump, or increased wear from occurring as a result.

SUMMARY OF THE INVENTION

An object of the present invention is to solve, or at least lessen, the technical problems discussed above. It is sought in particular to propose a particularly advantageous method for operating a device for delivering a liquid, in which method the device is filled upon a start of operation and is evacuated upon deactivation.

The objects are achieved, in one aspect, by a method according to the features of the claims. The features specified individually in the patent claims may be combined with one another in any desired technologically meaningful way and may be supplemented by explanatory facts from the description and in particular from the description of the figures, with further design variants of the invention being specified.

In one aspect, the invention relates to a method for operating a device for delivering a liquid, having a delivery line which can be divided into a suction line section, from a filter space in a tank to at least one pump, and a pressure line section, from the at least one pump to at least one injector, wherein the filter space is separated from an interior of the tank by at least one filter layer, and wherein the method comprises at least the following steps:

a) back-suctioning a liquid situated in the pressure line section counter to a usual delivery direction by way of the at least one pump;

b) monitoring at least one operating parameter of the at least one pump during the back-suctioning process, wherein the at least one operating parameter is representative of a counterpressure that the at least one pump operates against during the back-suctioning process; and c) detecting an increase in the counterpressure, and stopping the back-suctioning process.

In another aspect, a device for delivering a liquid, which device can be evacuated by way of the method described here, is preferably provided for delivering a liquid exhaust-gas purification additive into an exhaust-gas treatment device of an internal combustion engine. The device is preferably formed without a return line. That is to say, there is no branch from the pressure line section, downstream of the pump as viewed in the delivery direction from the tank to the injector, back into the tank. Thus, a circulation of liquid through the suction line section, the pump and back into the tank is not possible with the device. The evacuation of the device must accordingly be realized by way of backward delivery (back-suction) of the liquid by the at least one pump, wherein here, the liquid is moved counter to the usual/normal delivery direction. Here, the usual delivery direction is generally defined as the direction along the delivery line from the tank toward the injector. The delivery direction during the back-suctioning process, which is opposite to the usual delivery direction, may also be referred to as the back-suction direction.

The at least one pump is preferably a pump with a reversible delivery direction. The pump may, for example, be an orbital pump or a hose pump, in the case of which the delivery direction can be reversed by virtue of the drive of the pump being operated in the opposite direction. In the case of an orbital pump or in the case of a hose pump, to impart a delivery action, at least one seal of a delivery path is displaced along the delivery path within the pump. A seal refers to a closed region of the delivery path through which a fluid cannot passively flow. As a result of the displacement of the seal in the delivery direction along a delivery path, a closed pump volume is moved along the delivery path, and the liquid contained in the closed pump volume is delivered along the delivery path. In the case of a hose pump, the delivery path is formed by a hose, and the seal is a compressed section of the hose. In the case of an orbital pump, the delivery path is formed by a gap between a housing and a deformable diaphragm, and the seal is formed by a region in which the deformable diaphragm is pressed and bears against the housing. By way of a reversal of the operating direction of the drive of a hose pump or of an orbital pump, the direction of movement of the seal along the delivery path can be reversed, such that the delivery direction of the pump is also reversed.

In one design variant, the at least one pump is a reciprocating-piston pump or a diaphragm pump, the delivery direction of which can be reversed by way of a valve arrangement. In a yet further design variant, the pump is a flow pump with reversible delivery direction.

The method takes as a starting point in particular the operating situation in which the delivery line (in this case in particular the pressure line section) is (completely) filled with liquid, and dosing of liquid via the injector has possibly previously taken place. It is now desired to deactivate and thus evacuate the'device.

During the back-suctioning of the liquid in step a), air (and possibly also residual constituents of exhaust gas) is/are drawn in through the injector and the liquid is forced (back) into the filter space at an intake point at which the suction line section of the delivery line issues into the filter space. From the filter space, the liquid is forced onward through the filter layer into the interior of the tank. Here, the liquid thus flows counter to the normal delivery direction, that is to say away from the injector toward the pump and toward the tank.

The operating parameter monitored in step b) is representative of the pressure built up by the pump in the suction line section during the back-suctioning process. During normal dosing operation of the pump, a positive pressure is built up not in the suction line section but only in the pressure line section. Under these conditions, it is even the case that a negative pressure prevails in the suction line section, such that the liquid is suctioned from the filter space into the suction line section of the delivery line. In the case of a reversed delivery direction during the back-suctioning process, the pressure conditions in the suction line section and in the pressure line section are approximately reversed. Then, a negative pressure prevails in the pressure line section, whereas a positive pressure prevails in the suction line section. The operating parameter monitored by the pump is representative of the pressure in the suction line section. The pressure in the suction line section is dependent on the flow resistance of the liquid as it flows out of the suction line section into the filter space and into the interior of the tank. Inter alia, the throughflow resistance of the filter layer from the filter space back into the interior of the tank is also definitive for the pressure.

If an increase in the counterpressure is detected in step c), the air has passed into the filter space. The increase in the pressure is triggered by virtue of the air being forced against the filter layer by the pump. The filter layer is selectively permeable to the liquid. The permeability to the liquid is considerably greater than the permeability to air. Therefore, an increased counterpressure arises when the air has passed into the filter space or as far as the at least one filter layer. The back-suctioning process is then stopped. The stoppage of the back-suctioning process in step b) may be performed for example when the counterpressure that corresponds to the at least one operating parameter is higher than a predefined threshold value. Thus, an increase in the counterpressure is detected, and the back-suctioning process is stopped in a manner dependent on the counterpressure. In this way, it is possible to prevent the filter space from being (predominantly or even entirely) evacuated. In particular, it can be ensured that liquid still remains in the filter space and the liquid is not replaced there by air (entirely or in the region of the intake point). This makes it possible, firstly, to shorten the time of the back-suctioning process, because the filter space normally has a relatively large volume in relation to the delivery line. At the same time, the delivery line, the pump and further components (such as for example pressure sensors) adjoining the delivery line are protected against freezing liquid additive.

A selective permeability of the filter layer may be realized, for example, by virtue of the filter layer being a nonwoven material. A nonwoven material may be constructed from fibers (for example wires or wire filaments) which at least partially have an air-repelling action and thus prevent air from penetrating into the filter layer. If such a nonwoven material is wetted by the liquid, it can be passed through very easily by the liquid. If air impinges on the material, an ingress of air into the material is prevented by capillary forces. Thus, a flow of air through the material is also prevented. If the pressure difference across the filter layer between the filter space and the interior of the tank exceeds a threshold value, a passage of air through the filter layer is however possible despite such air-repelling characteristics of the material of the filter layer. Typically, suitable materials for the filter layer can maintain the selective permeability to the liquid only in the range of customary operating pressures.

The method is particularly advantageous if, after step c), at least the following further step is performed:

d) delivering liquid in the usual delivery direction until the filter layer has been fully filled with liquid again.

If an increase in the counterpressure is detected in step c), air is already present in regions at the at least one filter layer in the filter space. The filter layer can permanently block the air. It is therefore advantageous if, after step c), delivery in the usual delivery direction is performed. Owing to the delivery, the delivery line or the filter space is at least partially refilled. It can thus be ensured that the filter layer is charged with liquid during a deactivation of the device. Step d) may, for example, be performed with volume-based control and/or time-based control. In the case of step d) being performed with volume-based control, the pump is, in step d), operated such that a predefined amount of liquid (for example between 2 ml [milliliters] and 50 ml) is delivered. The amount is in particular selected such that the filter space is fully filled with liquid again, and the filter is thus fully wetted with liquid again. In the case of step d) being operated with time-based control, the pump is operated such that the pump is operated for a predefined time period (for example between 2 seconds and 5 seconds), wherein the time period is selected such that the filter space is completely filled with liquid again and the filter is thus fully wetted with liquid again. Step d) is preferably performed so as to ensure that the liquid does not advance as far as those components adjoining the delivery path which could be damaged by freezing liquid. It is also possible for step d) to be performed with (active) monitoring in order for the delivery during step d) to be stopped when the filter space and/or the delivery line have been refilled to an adequate extent. The monitoring may for example be performed by way of a pressure sensor.

The method is particularly advantageous if the at least one filter layer extends at least over a portion of a height of the tank such that the liquid can flow from the interior into the filter space at different heights.

The filter space is preferably a sub-volume at the base of the tank delimited with respect to the interior of the tank by the filter. The filter space preferably has a height that extends in the direction of the top side of the tank proceeding from the tank base. In other words, this means, for example, that the filter space is separated from the tank interior by a vertically arranged filter layer, wherein the liquid can thus also (depending on the fill level) flow through the filter layer over the entire vertical extent of the filter layer. It is alternatively possible for the filter space to be arranged below the tank, in the manner of a sump. Then, however, additional structural space for the filter space is required below the tank.

The method is furthermore advantageous if the suction line section of the delivery line extends from an upper region of the filter space.

There is preferably at least one intake point in the (vertically) upper region of the filter space, at which intake point the delivery line issues into the filter space. The at least one intake point is preferably arranged at a distance of less than 10 cm [centimeters] from a highest position of the filter layer. As already described further above, the filter layer preferably has selective permeability to the liquid and is, in particular, less permeable to air than to the liquid. If the interior of the tank is only partially filled with liquid, a situation may arise in which, at that surface of the filter layer oriented toward the interior of the tank, liquid is present in a lower region whereas air is present in an upper region. Under these conditions, it is ensured, by way of the intake point in the upper region of the filter space, that the filter space is always completely filled with liquid during the intake process. If air is present at the surface of the filter layer in the upper region, the air cannot be drawn into the filter space. Instead, the liquid is suctioned through the filter space (along the filter layer) to the intake point in the upper region.

Furthermore, the method is advantageous if the filter space forms a jacket that delimits a housing with the at least one pump with respect to the interior of the tank, wherein, in the housing, there is additionally arranged at least one heater for heating the liquid.

The housing preferably forms a (dry) chamber, which is separated from the interior of the tank and from the filter space, at the tank base of the tank, which chamber is surrounded by the filter space. If the filter space were completely evacuated during the evacuation process, the filter space would therefore form an air jacket around the housing. The air jacket would have an insulating action. A heater arranged in the housing would then no longer be capable, or would be capable only to a limited extent, of heating the liquid stored in the interior of the tank, because the air jacket would act as an insulation layer between the housing and the interior of the tank. For this reason, it is advantageous for the back-suctioning process to be stopped when air is present within the filter space. It is thus possible to prevent a closed air jacket from being formed around the housing.

In particular in a situation in which such a jacket forms in the filter space, it is advantageous for step c) to be followed by the above-discussed step d). If an increase in the counterpressure is detected in step c), air is already present at the filter layer in the filter space. The filter space has duly not been completely evacuated as a result of steps a) to c) being carried out, but a (slight) partial evacuation of the filter space has nevertheless already been performed. The partial evacuation is reversed again by way of step d). It is thus also possible to prevent a regional (heat) insulation action of the air within the filter space.

The fill level of liquid still desired in the filter space at the end of the back-suctioning process can in particular be set on the basis of the predefined or adapted threshold value for the detected operating parameter.

The heater is preferably of self-regulating design. The heater may, for example, comprise at least one PTC (positive temperature coefficient) heating element. In the case of such a heating element, a reduction in heating power occurs automatically when the temperature of the heating element reaches a threshold value.

Furthermore, the method is advantageous if the operating parameter of the pump monitored in step b) is at least one of the following parameters:
    an electrical power consumed by a drive of the pump;
    an electrical current consumed by a drive of the pump;
    an operating voltage consumed by a drive of the pump;
    a movement speed of a drive of the pump;
    a pressure or a pressure gradient built up by the pump in the suction line section during the back-suctioning process.

The electrical power consumed by the pump, the consumed electrical current and the consumed operating voltage are representative of the electrical energy consumed by the pump during the back-suctioning process, wherein the question of which of the stated parameters is particularly suitable for detecting the consumed electrical energy may depend on the type of construction of the pump. The greater said electrical energy is, the greater the counterpressure that arises in the suction line section during the back-suctioning process. For this reason, the parameters may be used (individually or in combination) in order to measure the counterpressure in the suction line section and in order to carry out step c) of the described method. Here, the monitoring of the parameters is possible without the need for additional components on the suction line section for the purposes of monitoring the counterpressure. It is merely the case that suitable electronics are required for the evaluation of the supply voltage and/or of the supply current of the pump.

The drive of the pump, the speed of movement of which can be evaluated, comprises for example a movable pump element which, for delivery purposes, is moved in translational fashion, or a rotary drive, which rotates for delivery purposes. A movable pump element may be, in particular, a piston or a diaphragm. Here, a speed of movement of a drive refers to a speed of movement of such a movable pump element or of a rotary drive. A drive of the pump preferably has at least one coil configured to generate a magnetic field that exerts a force on the movable pump element or on the rotary drive such that the movable pump element or the rotary drive is set in motion.

When the drive of the pump moves at high speed, a low counterpressure prevails. The higher the counterpressure is, the greater is the resistance that opposes the movement of the drive. Therefore, the speed of movement of the pump is also a parameter which, depending on the type of construction of the pump, may be representative of the counterpressure in the suction line section during the back-suctioning process. The speed of movement of the drive of the pump may for example be monitored by virtue of an induced voltage in a drive coil of the pump being detected.

It is also possible for a pressure or a pressure gradient in the suction line section to be directly monitored. It is for example possible for there to be arranged on the suction line section a pressure sensor by which the pressure in the suction line section can be monitored.

Also proposed is a motor vehicle, having at least an internal combustion engine, an exhaust-gas treatment device for the purification of the exhaust gases of the internal combustion engine, and a device for delivering a liquid to the exhaust-gas treatment device, wherein the device is configured to be operated in accordance with the described method.

The device is preferably also configured to deliver the liquid into the exhaust-gas treatment device. The liquid is preferably a urea-water solution which can be used in the exhaust-gas treatment device for exhaust-gas purification purposes. In the exhaust-gas treatment device there is preferably an SCR catalytic converter at which nitrogen oxide compounds in the exhaust gas of the internal combustion engine can be reduced with the aid of the liquid. The device may have all of the device features discussed in conjunction with the described method.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and in particular the illustrated proportions are merely schematic. In the figures.

DETAILED DESCRIPTION OF THE PRESENTLY PREFERRED EMBODIMENTS

Figure 1:
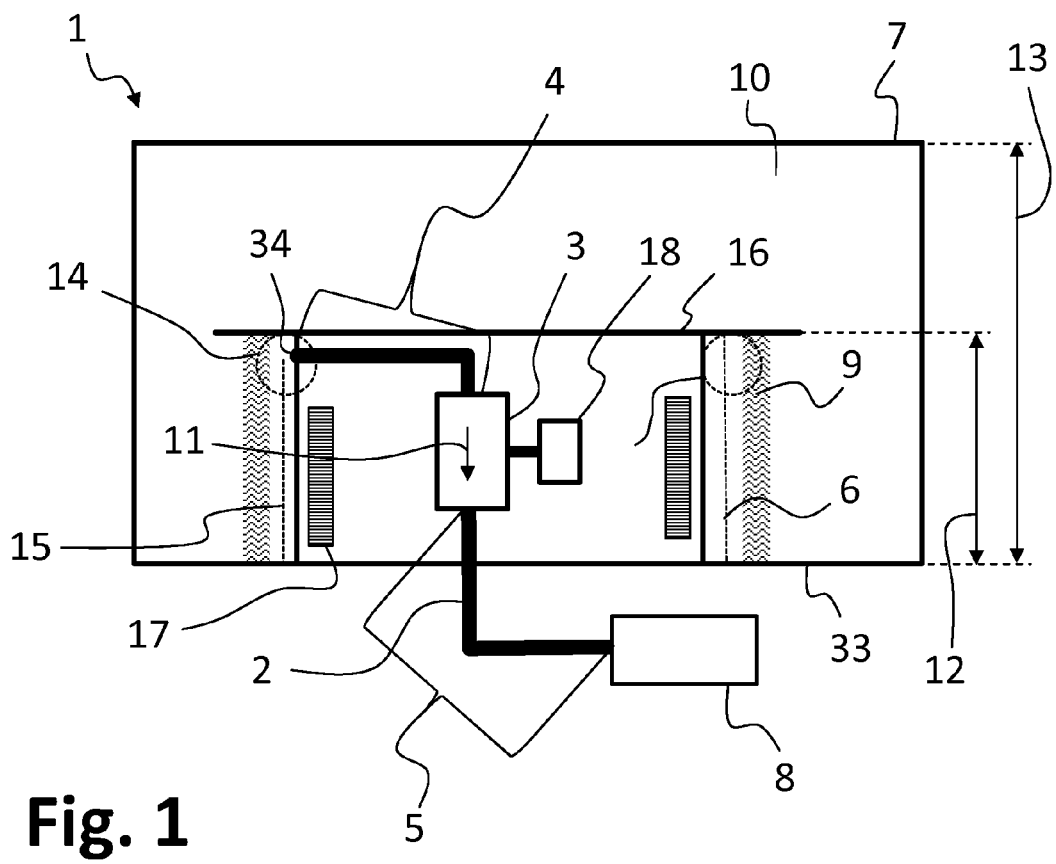
FIG. 1: shows a first design variant of a device for the described method.

FIG. 1 illustrates a first design variant of a device 1 which can be evacuated in accordance with the described method. The device 1 comprises a tank 7, in the interior 10 of that the liquid (in particular an aqueous urea-water solution) is stored. In the tank 7 there is arranged a housing 16 which extends into the interior 10 of the tank 7 from the tank base 33. The tank 7 has a height 13. The housing 16 extends over a portion 12 of the height 13 of the tank 7. The filter space 6 is formed as an encircling jacket 15 around the housing 16. The filter space 6 is separated from the interior 10 of the tank 7 by a filter layer 9. A heater 17 is arranged in the housing 16. The heater 17 is designed to supply heat through the filter space 6 and the filter layer 9 to liquid stored in the interior 10 of the tank 7. For this purpose, it is provided that the filter space 6 is filled with liquid in order to realize good thermal conductivity through the filter space 6.

In the housing 16 there are situated functional components of the device 1 which serve to deliver the liquid from the tank 7 to an injector 8. The functional components comprise, in particular, a pump 3 which performs the delivery of the liquid and which has a drive 18 that is preferably an electric motor.

Proceeding from the filter space 6, a delivery line 2 extends from the filter space 6 to the injector 8. The pump 3 is also arranged on the delivery line 2. The delivery line 2 is divided by the pump 3 into a suction line section 4, from the filter space 6 to the pump 3, and a pressure line section 5, from the pump to the injector 8. Proceeding from the filter space 6 toward the injector 8, the pump 3 delivers the liquid in a usual delivery direction 11. The delivery line 2 or the suction line section 4 of the delivery line 2 issues into an upper region 14 of the filter space 6 at an intake point 34.

Figure 2:
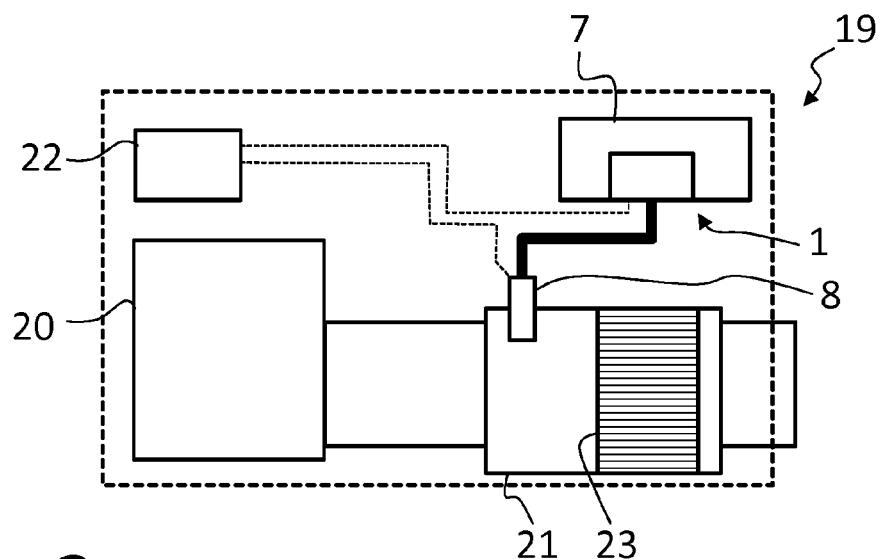
FIG. 2: shows a motor vehicle having a device for the described method.

The motor vehicle 19 shown in FIG. 2 has an internal combustion engine 20 and has an exhaust-gas treatment device 21 for the purification of the exhaust gases of the internal combustion engine 20. A liquid for exhaust-gas purification purposes can be fed to the exhaust-gas treatment device 21 by way of a device 1. The liquid is preferably a reducing agent precursor solution. In the exhaust-gas treatment device 21 there is provided an SCR catalytic converter 23 by which nitrogen oxide compounds in the exhaust gas of the internal combustion engine 20 can be reduced. The device 1 delivers the liquid out of a tank 7 in which the liquid is stored. For the provision of the liquid at the exhaust-gas treatment device 21, an injector 8 is provided, which permits dosed dispensing of the liquid. The motor vehicle 19 preferably has a control unit 22, which is connected at least to the pump (not illustrated here) and to the injector 8 of the device 1 in order to control the operation of the device 1. In particular, executable routines for carrying out the described method are also stored, for example in a non-transitory computer-readable medium, in the control unit.

Figure 3:
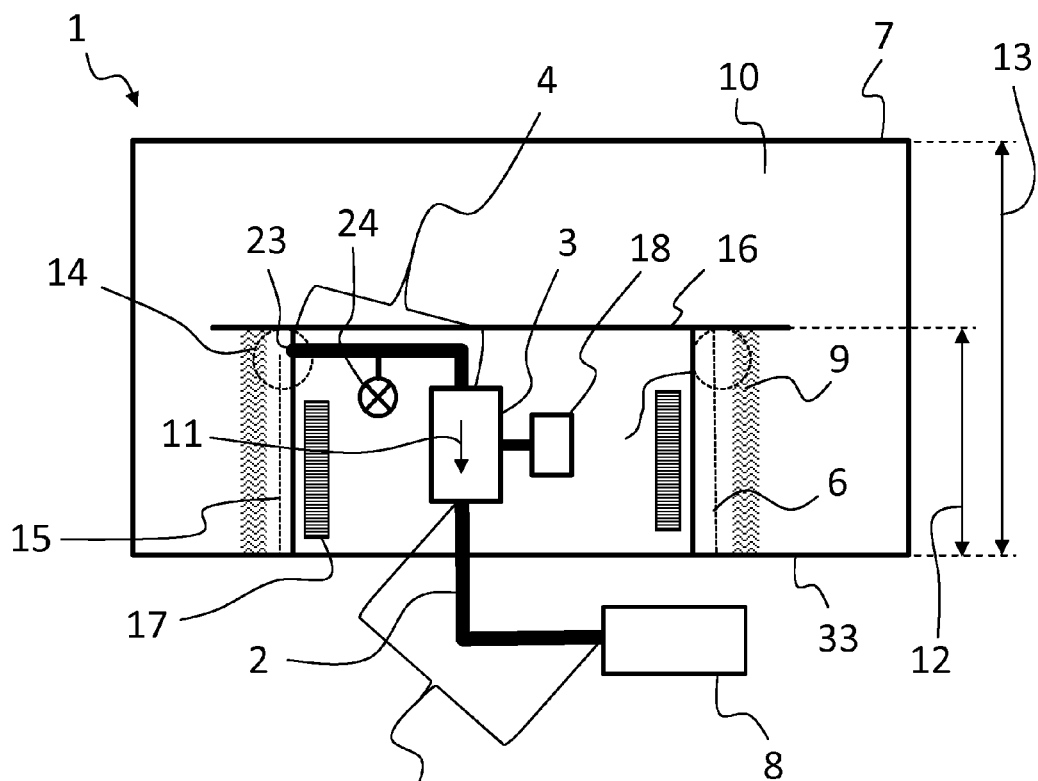
FIG. 3: shows a second design variant of a device for the described method.

FIG. 3 shows a modification of the device 1 as per FIG. 1, wherein, in the suction line section 4, there is arranged a pressure sensor 24 by which the pressure in the suction line section 4 during the back-suctioning process can be actively monitored.

Figure 4:
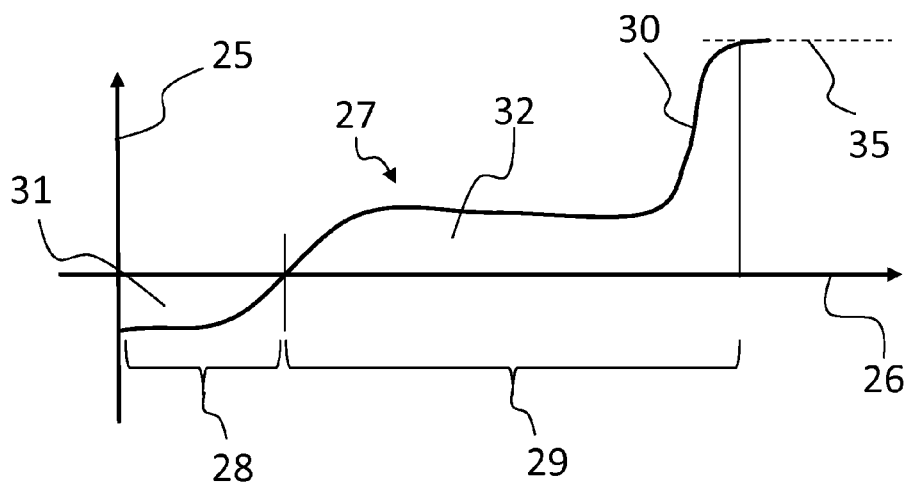
FIG. 4: shows a profile of the pressure in the suction line section during the execution of the described method.

An exemplary pressure profile 27 in the suction line section, such as arises immediately before the back-suctioning process and during the back-suctioning process, is illustrated in FIG. 4 on the time axis 26 versus the pressure axis 25. Along the time axis 26, there is firstly illustrated a suction phase 28, during which usual operation (dosing) of the device is still performed, and during which a negative pressure 31 prevails in the suction line section. At the time when the pressure profile 27 intersects the time axis 26, the evacuation phase 29 begins, during which back-suctioning of the liquid is performed. The pressure in the suction line section is now positive, because the liquid is now forced out of the pressure line section through the suction line section and back into the filter space and into the interior of the tank. At the end of the evacuation phase 29, a significant pressure increase 30 occurs, which is detected (method step c)). It is thus possible, when a threshold value 35 is reached, for the evacuation phase 29 to be stopped.

The described method is particularly advantageous for targetedly evacuating the device for the provision of liquid and, in so doing, expending the least possible energy for the back-suctioning process, and at the same time ensuring that the device is evacuated only to the extent necessary, so as to prevent damage being caused to components of the device by freezing liquid in the delivery line of the device.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a device configured to deliver a liquid, the device having a delivery line dividable into a suction line section, from a filter space in a tank to at least one pump, and into a pressure line section, from the at least one pump to at least one injector, wherein the filter space is separated from an interior of the tank by at least one filter layer, the method comprising:
   a) back-suctioning a liquid situated in the pressure line section counter to a delivery direction by the at least one pump;
   b) monitoring at least one operating parameter of the at least one pump during the back-suctioning, wherein the at least one operating parameter is representative of a counterpressure that the at least one pump operates against during the back-suctioning; and
   c) detecting an increase in the counterpressure, and stopping the back-suctioning.

2. The method as claimed in claim 1, the method further comprising, after step c):
   d) delivering liquid in the delivery direction until the filter space has been fully filled with liquid again.

3. The method as claimed in claim 1, wherein the at least one filter layer extends at least over a portion of a height of the tank such that the liquid can flow from the interior into the filter space at different heights.

4. The method as claimed in claim 1, wherein the suction line section of the delivery line extends from an upper region of the filter space.

5. The method as claimed in claim 1, wherein the filter space forms a jacket delimiting a housing with the at least one pump with respect to the interior of the tank, wherein, at least one heater for heating the liquid is arranged in the housing.

6. The method as claimed in claim 1, wherein the operating parameter of the pump monitored in step b) is at least one of the following parameters:
   an electrical power consumed by a drive of the pump;
   an electrical current consumed by a drive of the pump;
   an operating voltage consumed by a drive of the pump;
   a movement speed of a drive of the pump;
   a pressure or a pressure gradient built up by the pump in the suction line section during the back-suctioning process.

7. A motor vehicle, having at least an internal combustion engine, an exhaust-gas treatment device configured to purify the exhaust gases of the internal combustion engine, and a device configured to deliver a liquid to the exhaust-gas treatment device, wherein the device is configured to be operated in accordance with a method for operating the device configured to deliver the liquid, the device having a delivery line dividable into a suction line section, from a filter space in a tank to at least one pump, and into a pressure line section, from the at least one pump to at least one injector, wherein the filter space is separated from an interior of the tank by at least one filter layer, the method including:
   a) back-suctioning a liquid situated in the pressure line section counter to a delivery direction by the at least one pump;
   b) monitoring at least one operating parameter of the at least one pump during the back-suctioning, wherein the at least one operating parameter is representative of a counterpressure that the at least one pump operates against during the back-suctioning; and
   c) detecting an increase in the counterpressure, and stopping the back-suctioning.

* * * * *